United States Patent [19]

Hawryluk

[11] 4,030,457

[45] June 21, 1977

[54] VAPOR CARBURETOR

[75] Inventor: Peter Hawryluk, Saskatoon, Canada

[73] Assignee: The Raymond Lee Organization, Inc., New York, N.Y.; a part interest

[22] Filed: Oct. 21, 1975

[21] Appl. No.: 624,534

[52] U.S. Cl. .................. 123/34 A; 123/122 AA; 123/122 C; 123/127; 123/133

[51] Int. Cl.² ..................... F02M 13/02

[58] Field of Search ......... 123/34 A, 122 C, 122 E, 123/122 B, 122 AA, 122 AB, 127, 133

[56] References Cited

UNITED STATES PATENTS

| | | | |
|---|---|---|---|
| 2,185,573 | 1/1940 | Spindler | 123/133 |
| 2,858,820 | 11/1958 | Oddera | 123/133 |
| 3,713,429 | 1/1973 | Dwyre | 123/127 |
| 3,741,180 | 6/1973 | Eichbaum | 123/133 X |

Primary Examiner—Robert G. Nilson
Attorney, Agent, or Firm—Howard I. Podell

[57] ABSTRACT

A device for feeding vaporized gasoline into the intake of an internal combustion engine. The fuel-air line leading from the conventional engine carburetor is passed through a chamber heated by exhaust gas to the intake ducts of the engine. The fuel line from the fuel pump travels through an electrically operated valve which directs the fuel either to the carburetor, for starting the engine, or alternately in a warmed engine, to a metering valve located on the fuel-air line in the heated chamber. The fuel line from the valve to the metering device passes through an auxilliary heating chamber to vaporize the fuel prior to its passage through the metering device into the engine fuel-air line.

1 Claim, 3 Drawing Figures

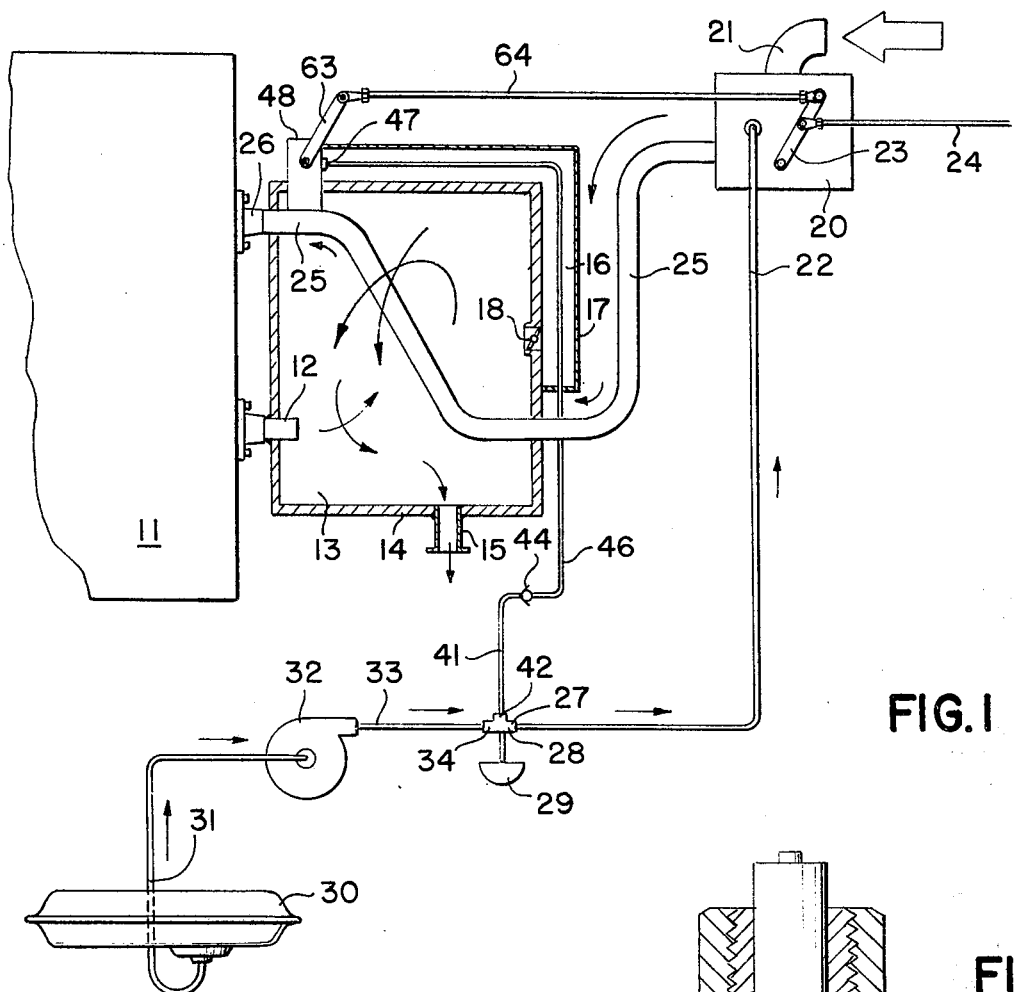
FIG. 1
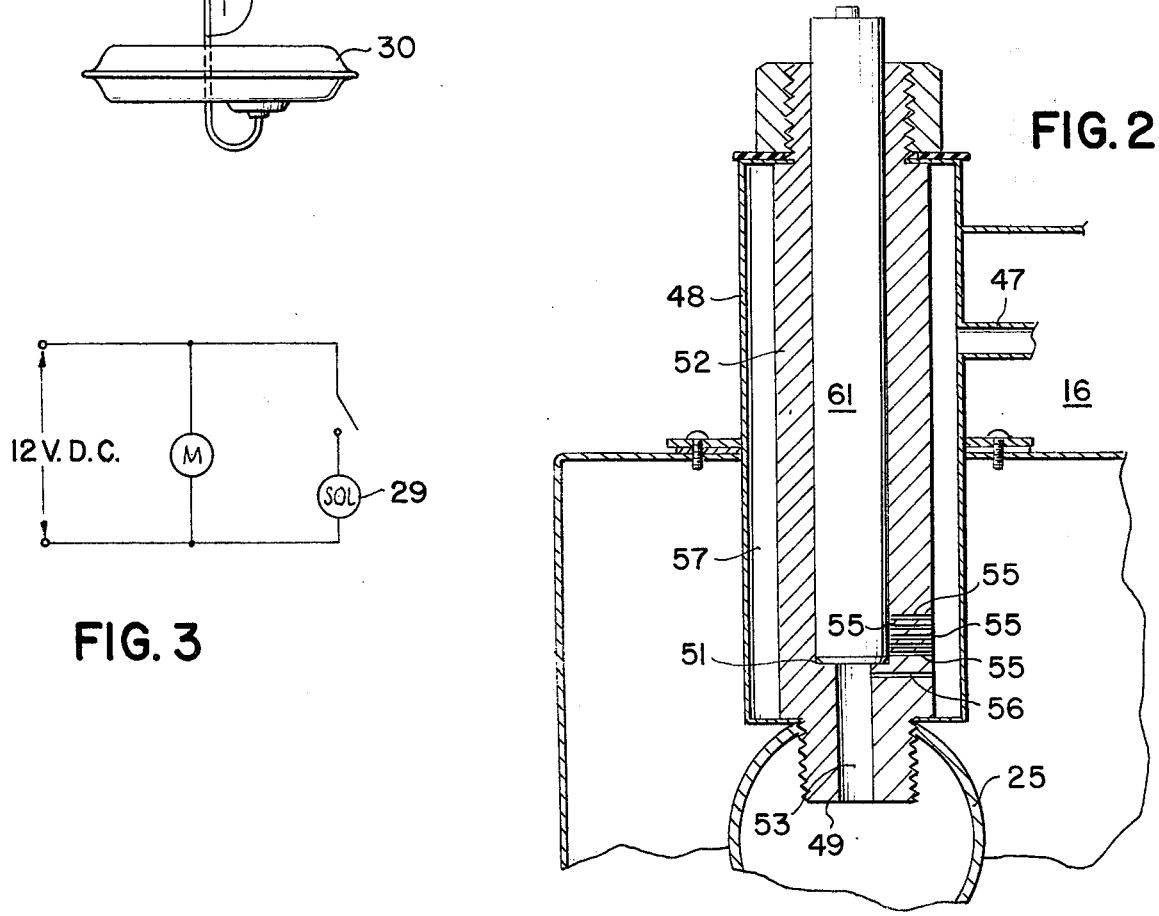
FIG. 2
FIG. 3

VAPOR CARBURETOR

SUMMARY OF THE INVENTION:

My invention is a device for feeding vaporized gasoline into the intake of an internal combustion engine. The fuel-air line leading from the conventional engine carburetor is passed through a chamber heated by exhaust gas to the intake ducts of the engine. The fuel line from the fuel pump travels through an electrically operated valve which directs the fuel either to the carburetor, for starting the engine, or alternately in a warmed engine, to a metering valve located on the fuel-air line in the heated chamber. The fuel line from the valve to the metering device passes through an auxilliary heating chamber to vaporize the fuel prior to its passage through the metering device into the engine fuel-air line.

An automobile engine equipped with my device performs at increased fuel economy and creates a minimum of exhaust pollution.

BRIEF DESCRIPTION OF THE DRAWINGS:

The objects and features of the invention may be understood with reference to the following detailed description of an illustrative embodiment of the invention, taken together with the accompanying drawings in which:

FIG. 1 is a schematic view of the invention installed;
FIG. 2 is a sectional view of the metering valve; and
FIG. 3 is a schematic view of the electrical circuit.

DESCRIPTION OF THE PREFERRED EMBODIMENT:

Turning now descriptively to the drawings, in which similar reference characters denote similar elements throughout the several views, FIG. 1 illustrates an internal combustion engine block 11, the exhaust duct 12 of which leads into a heating chamber compartment 13 enclosed by a housing 14, with the outlet pipe 15 of the compartment connected to the exhaust pipe of the vehicle in which the engine is mounted. An auxiliary heating compartment 16 enclosed by housing 17 is joined by a thermostatically-controlled valve 18 to compartment 13 so as to maintain the temperature in auxiliary compartment 16 at a pre-set temperature. A conventional carburetor 20 is fitted with an air intake duct 21 and a fuel intake line 22, with the carburetor 20 regulated by a pivoted lever arm 23 joined by a rod 24 to the accelerator pedal of the vehicle. The fuel-air line 25 leading from the carburetor 20 is led into heating compartment 13, for warming the air and vaporized fuel drawn from the carburetor 20, and then led into the engine intake duct 26.

Fuel line 22 leads from the normally open (N.O.) outlet 27 of three-way valve 28 controlled by solenoid 29, with the liquid fuel initially led from fuel tank 30 through line 31 to fuel pump 32 which forces fuel through line 33 into the inlet 34 of valve 28.

With valve 28 in the Normally Open position, the carburetor 20 of the engine functions in normal fashion, for starting of a cold engine. As the started engine warms, the fuel air mixture in the fuel-air line 25 is pre-heated prior to entering the engine.

A fuel line 41 connected to the Normally Closed (N.C.) outlet 42 of valve 28 joins a check-valve 44 permitting flow to connected tube 46 which is led into auxiliary heating chamber 16 to the intake 47 of metering valve 48, with the outlet 49 of metering valve 48 led into the fuel-air line 25 from the carburetor, adjacent to the connection of line 25 to the engine intake duct 26.

As shown in FIGS. 1–2, the outlet 49 of metering valve 48 is threaded into the fuel air line 25, with an internal passage way 53 leading from the outlet 49 to an axial chamber 51 enclosed by the valve body 52.

Axial chamber 51 is joined by several passage ways 55 to an outer compartment 57 with passage ways 55 selectively blocked by location of valve piston 61. Movement of valve piston 61 away from the outlet 49 selectively opens up one or more passage ways 55 to permit the flow of controlled amount of fuel in outer compartment 57 to valve outlet passageway 53. An idle passageway 56 is permanently open between outer compartment 57 and outlet passageway 53 to permit idling of the engine when piston 61 is in the freely extended position and closed position. Piston 61 is linked to external pivotable valve lever 63 so that rotation of lever 63 moves piston 61 from the closed to an open position or vice-versa. Lever 63 is linked by rod 64 to carburetor lever 23 so that levers 64 and 23 work in unison from throttle rod 24.

Once the engine is in the operating mode, solenoid valve 27 is closed to stop flow of fuel to the carburetor 20 and cause the fuel to flow in line 46 into auxiliary heating compartment, vaporizing the fuel in line 46 and leading the heated fuel vapor into the metering valve 48 and then into the engine intake duct 25. In this latter mode of operation, the fuel air line 25 carries only air from the carburetor intake duct 21, but the air is heated as the line 25 is enclosed in heating chamber 13 prior to introduction of metered amounts of heated fuel vapor from valve 48.

Thermostatic valve 18 regulates the temperature of auxiliary heating compartment 16 to avoid excessive temperature in the fuel line 46 passing through compartment 16.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A fuel feed system for an internal combustion engine which selectively heats the fuel supply line and the air supply line prior to mixture of the fuel air intake of the engine, comprising
    an internal combustion engine fitted with a carburetor fed by a first fuel line from a fuel pump and an air intake, joined to a fuel-air engine intake pipe,
    a first chamber, the interior of which is supplied by exhaust gas from said engine, with the said fuel-air intake pipe led through said first chamber to the intake duct of said engine.
    a second fuel line joined by a valve to the first fuel line by a remote-controlled valve which serves to channel the flow of fuel from the fuel pump alternately into said first fuel line or into said second fuel line,
    a second chamber, the interior of which is joined by thermostatic valve control means to the interior of the first chamber, with the said second fuel line led through said second chamber to a regulating valve joining said second fuel line to the fuel-air intake pipe at a location adjacent the outlet end of said first fuel line in said first chamber, such that air in the fuel-air intake pipe may be heated independently and at a different temperature from the fuel in the second fuel line and such that fuel in the second fuel line and such that fuel in the second fuel line will be admitted into the fuel-air intake pipe through the regulating valve after both the fuel and the air have been independently heated.

* * * * *